UNITED STATES PATENT OFFICE.

LUCIEN EILERTSEN, OF PARIS, FRANCE.

ANTISEPTIC AND PERFUMED BLOCK FOR DENTAL STOPPINGS AND OTHER SIMILAR PURPOSES.

No. 825,268.     Specification of Letters Patent.     Patented July 3, 1906.

Application filed October 7, 1903. Serial No. 176,095.

*To all whom it may concern:*

Be it known that I, LUCIEN EILERTSEN, a citizen of the French Republic, and a resident of Paris, France, have invented certain new and useful Antiseptic and Perfumed Blocks for Tooth-Fillings and other Dental Purposes, of which the following is a specification.

The object of the present invention is to provide a material having a basis of cellulose, casein, gelatin, and, in a single word, of any plastic material insoluble by itself or rendered insoluble by any process whatsoever which is capable of being used in dental practice and used for constituting antiseptic alkaline, perfumed blocks having an agreeable taste, of any suitable form or size, serving as temporary and removable fillings for filling decayed teeth, perfuming the mouth, and other uses. Nitrocellulose is an example of an insoluble material which may be used for this purpose.

These blocks are made antiseptic by the incorporation of antiseptic substances—such as salol, iodoform, and the like—and the smell and taste thereof, generally disagreeable, are overcome by other and agreeable substances, such as essence of roses, violets, orange, &c. I also claim the right of introducing into these blocks substances, such as bicarbonate of soda, capable of producing an alkaline action.

I am at the disposal of the respective governments to give in detail a few examples for the manufacture of the antiseptic and alkaline blocks to which this invention relates.

These movable blocks thus constituted, and to which any shape may be given, have the advantage of not only approximatively filling the hollow of a decayed tooth, thereby avoiding in a great measure the introduction of food-stuffs and other foreign matters, while presenting a resisting-surface for mastication, but of also acting in different manners upon the decayed portions by the substances incorporated with them. The fermentations are counteracted by the antiseptic substances, which disengage very slowly from these blocks, and the acidity resulting often from the fermentations, is counteracted by the alkaline principles.

It is preferable not to render the substances forming the body of these blocks perfectly insoluble, so that in case of accidental deglutition they dissolve gradually in the organism.

It is clear that these same movable blocks, which serve as temporary fillings, can be used in any form to perfume the mouth and to give an agreeable taste owing to the perfumes and special products incorporated therein.

Having now fully described my invention, what I claim, and desire to secure by Letters Patent, is—

1. The herein-described perfumed antiseptic dental composition having as a basis cellulose, casein, gelatin, or other plastic material, which is of an insoluble nature or rendered insoluble to any desired degree, with which are incorporated antiseptics, alkalies, perfumes and substances agreeable to the palate.

2. A perfumed antiseptic dental composition comprising an insoluble base of nitrocellulose, said base being rendered antiseptic by combining therewith suitable antiseptic substances, and perfumed by combining therewith other suitable substances and rendered capable of producing an alkaline action by combining therewith bicarbonate of soda or the like.

LUCIEN EILERTSEN.

In presence of—
    ADOLPHE STURM,
    PAUL F. PÂQUET.